US010474926B1

(12) United States Patent
Dirac et al.

(10) Patent No.: US 10,474,926 B1
(45) Date of Patent: Nov. 12, 2019

(54) GENERATING ARTIFICIAL INTELLIGENCE IMAGE PROCESSING SERVICES

(71) Applicant: Amazon Technologies, Inc., Seattle, WA (US)

(72) Inventors: Leo Parker Dirac, Seattle, WA (US); Vineet Khare, Redmond, WA (US); Gurumurthy Swaminathan, Redmond, WA (US); Xiong Zhou, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/815,492

(22) Filed: Nov. 16, 2017

(51) Int. Cl.
*G06K 9/62* (2006.01)
*G06N 3/04* (2006.01)
*G06N 3/08* (2006.01)

(52) U.S. Cl.
CPC ......... *G06K 9/6227* (2013.01); *G06K 9/6256* (2013.01); *G06N 3/0454* (2013.01); *G06N 3/08* (2013.01)

(58) Field of Classification Search
CPC .. G06K 9/6267; G06K 9/3241; G06K 9/6256; G06N 20/00; G06N 3/0454; G06N 3/08; G06N 5/022; G06N 5/04; G06N 5/046; G06N 7/005; H04N 5/23206
See application file for complete search history.

(56) References Cited

U.S. PATENT DOCUMENTS

| 9,589,210 | B1* | 3/2017 | Estrada | G06T 7/344 |
| 9,704,054 | B1* | 7/2017 | Tappen | G06K 9/46 |
| 9,754,190 | B1* | 9/2017 | Guttmann | G06K 9/6267 |
| 9,892,133 | B1* | 2/2018 | Biessmann | G06F 16/5838 |
| 2014/0270494 | A1* | 9/2014 | Sawhney | G06K 9/00979 382/159 |
| 2016/0342863 | A1* | 11/2016 | Kwon | G06K 9/4647 |
| 2018/0005134 | A1* | 1/2018 | Kish | G06F 9/46 |
| 2018/0075338 | A1* | 3/2018 | Gokmen | G06N 3/0635 |
| 2018/0121762 | A1* | 5/2018 | Han | G06K 9/4604 |
| 2018/0144214 | A1* | 5/2018 | Hsieh | G06T 7/0012 |
| 2018/0204065 | A1* | 7/2018 | Pavetic | G06K 9/00718 |
| 2018/0225993 | A1* | 8/2018 | Buras | A61B 8/06 |
| 2018/0232663 | A1* | 8/2018 | Ross | G06N 3/08 |
| 2018/0330166 | A1* | 11/2018 | Redden | G06K 9/00657 |

(Continued)

OTHER PUBLICATIONS

Dmlc mxnet Model Gallery. https://github.com/dmlc/mxnet-model-gallery/blob/master/README.md. Downloaded Feb. 27, 2018.

(Continued)

*Primary Examiner* — Jingge Wu
(74) *Attorney, Agent, or Firm* — Knobbe, Martens, Olson & Bear, LLP (57) ABSTRACT

Features related to systems and methods expediting generation of a machine learning model, such as an image recognition model, are described. Existing machine learning models are analyzed to identify a starting point for creating the new machine learning model. An existing machine learning model can suggest learning parameters (e.g., training parameters or structural features of the model) that can be used to expedite the generating and training process along with training data that can augment the training of the new machine learning model.

19 Claims, 5 Drawing Sheets

(56) References Cited

U.S. PATENT DOCUMENTS

2018/0336479 A1* 11/2018 Guttmann .............. G06N 20/00
2018/0365065 A1* 12/2018 Guttmann .............. G06N 20/00

OTHER PUBLICATIONS

Mxnet-fineturner. https://github.com/knjcode/mxnet-finetuner/blob/master/README.md. Downloaded on Feb. 27, 2018.

* cited by examiner

GENERATING ARTIFICIAL INTELLIGENCE IMAGE PROCESSING SERVICES

BACKGROUND

A service provider may make a network service available for use by third parties. For example, the field of utility computing involves a service provisioning model in which a service provider makes computing resources and infrastructure management available to client devices on demand. For example, a user may wish to deploy an image processing service to analyze image data such as of products, users, or documents. Image processing services can rely on sophisticated modeling and training to provide accurate analysis of image data. The modeling and training can be resource and time intensive operations and require significant understanding of the complexities contributing needed to produce a satisfactory model.

Network service models allow users to access networked resources (e.g., applications, services, and data) via a client program, such as a web browser. Network services, such as web services, provide programmatic access to networked resources including technology platforms (e.g., image processing applications and services) and data (e.g., image data and other databases) hosted on networked computers via a service interface. Generally speaking, a network service interface provides a standard, cross-platform API (Application Programming Interface) for communication between a client requesting some service to be performed and the service provider. In some embodiments, a network service interface may be configured to support the exchange of documents or messages including information describing the service request and response to that request. Such documents, or messages, may be exchanged using standardized or proprietary messaging protocols, such as the Hypertext Transfer Protocol (HTTP), and may be formatted in a platform-independent data format, such as eXtensible Markup Language (XML).

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Network services can be powerful tools that allow clients to perform a wide variety of processing operations. For example, image analysis algorithms can be applied to many domains, such as medical or health care, social networks, autonomous driving, and others. With advances in artificial intelligence, machine learning, and related applications, more and more users are engaging with such systems. Wide adoption, however, can be hindered in part because not all users in these domains have sufficient time or resources to deploy state-of-the-art solutions. The features described in this application provide an end-to-end solution to generate image processing services for users with little or no prior knowledge of image analysis or artificial intelligence techniques.

Users can engage with the system in a variety of modes. In one mode, the system trains deep learning models for a user-specified labeled data set. In one mode, the system can apply minor adjustments to pre-trained models available within the system to tailor the model for processing the user specified labeled data set. In one mode, the system can score labeled images using the either pre-trained, adjusted, or generated machine learning models.

The features described help guide the generation of a new image model in an efficient manner according to a modeling request. The modeling request includes information that drives the generation, such as training data or specific task information to be performed by the model. A requesting device need not understand the different technical requirements of machine learning models, training techniques, or other nuances of artificial intelligence to generate a robust image processing service.

The systems and methods described include features for expediting generation of a new machine learning model, such as an image recognition model. Existing models are analyzed to identify a starting point for creating the new machine learning model. An existing model can suggest learning parameters (e.g., training parameters or structural features of the model) that can be used to expedite the generating and training process along with training data that can augment the training of the new machine learning model.

Figure 1:
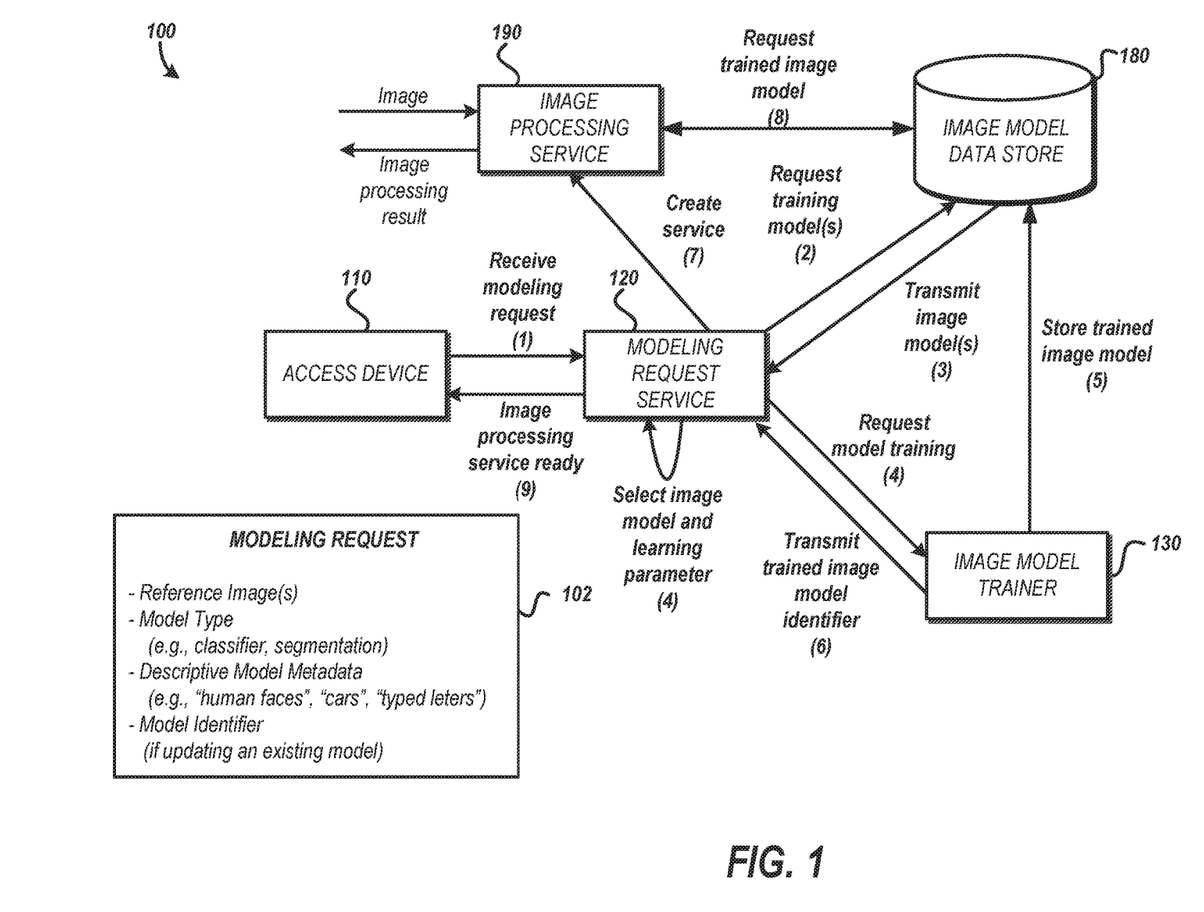
FIG. 1 is a block diagram showing an environment for generating an image processing service from a modeling request.

FIG. 1 is a block diagram showing an environment for generating an image processing service from a modeling request. The environment 100 includes several entities which communicate to generate an image processing service 190. The image processing service 190 receives an image as an input and generates an image processing result (sometimes referred to as a prediction) as an output. The image processing result may indicate whether a particular object is shown in the input image, where a particular object is shown in the input image, or what object or objects are shown in the input image. In one embodiment, the image processing result includes a set of indications, each associated with a confidence in the result. For example, if the image provided to the image processing service 190 shows a basketball, the machine learning model for recognizing sporting goods may provide an image processing result indicating that a basketball is shown with a 90% confidence and a volleyball is shown with a 30% confidence, and a football is shown with a 1% confidence. In this way, the requesting device can perform further processing based not only on the recognized objects but also the model's confidence in the recognition.

In the embodiment shown in FIG. 1, the creation of the image processing service 190 is initiated by a modeling request 102. The modeling request 102 includes reference images. In one embodiment, the modeling request 102 includes the images as part of the request. In one embodiment, the modeling request 102 includes a reference to the reference images such as a network location of the training image data. The modeling request 102 includes a model type indicating a task for the model should be trained to perform such as classify objects shown in an image, segment objects shown in an image, or other machine learning image processing tasks related to computer vision. The modeling request 102 includes descriptive model metadata that indicates the objects or task associated with the requested model. The modeling request 102 optionally includes a model identifier to allow requesting of retraining of an existing model. The modeling request 102 optionally includes an identifier for the client requesting the model. The identifier of the client may be used to identify a topical domain to which the requested model will apply. For example, if the client is a doctor, the topical domain for the requested model may be medical imaging. The domain may be identified based on a profile stored in a data store for the client. The request may include an identifier for the client which can be used to retrieve the profile to determine one or more domains associated with the client. The topical domain information for the client may be compared with domain information for existing models or clients that created the existing models. If the domain information for the request corresponds to domain information for an existing model, the existing model may be included in the process of generating the new machine learning model.

The access device 110 transmits the modeling request to a modeling request service 120. The modeling request service 120 interprets the modeling request 120 and coordinates the generation of an image processing service 190 for the modeling request 120. In previous systems, a new image model may be trained to perform the task specified in the modeling request 102. However, training each model from scratch for each request can be time or resource intensive. Embodiments of the present disclosure can avoid this inefficiency and high resource demand.

To address training inefficiencies, the modeling request service 120 identifies previously trained models from an image model data store 180 based on the request. For example, if the image model data store 180 includes a previously trained model associated with descriptive metadata corresponding to the descriptive metadata provided in the modeling request 102, the previously trained model may serve as a starting point for generating the requested model. Metadata, such as domain information, may be associated with a client requesting the previously trained model and used to identify a previously trained model.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

In one embodiment, the structural features of the previously trained model are used to generate the requested model. For example, the model may be implemented using a convolution neural network including a convolution layer and fully connected layer. Based on the comparison between the model request and the previously trained model, the modeling request service 120 selects one or both of the layers for inclusion in the new machine learning model. Additional structural features include: a number of nodes, a number of fully connected layers, organization of the output layer, network architecture, activation function, or the combination of layers.

In one embodiment, the training parameters used to train the previous model are used to generate the requested model. Training parameters may include one or more of: a number of training generations, a node activation function, an error gradient, optimizer, learning rate, and the like.

In addition to or as an alternative to metadata comparisons, embodiments of the modeling request service 120 include consideration of the reference image data associated with the modeling request 102. For example, the modeling request service 120 may generate a metric describing one or more aspect of the reference image data and training data for a model. By comparing the metrics, similarities between the data can be identified which further indicates that a model trained on similar images may be a good starting model for generating the requested model. In some embodiments, one or more reference images may be processed using an existing model and the existing model that provides a highest confidence image processing result may be selected.

In addition to or as an alternative to metadata comparisons, embodiments of the modeling request service 120 include consideration of interaction data with image processing services associated with different models. For example, if a model is used many times over a period of time as compared to another model, the model's utilization may indicate that the model is superior to other models.

The process of using learning parameters from one or more previously trained models may be referred to as meta-hyper parameter optimization (Meta HPO). The system searches not only through common parameters related to the models and training (such as number of layers and learning rate) but it also searches through the type of models being trained. For example, where the models are neural networks, the types of models may include Visual Geometry Group (VGG) networks, residual networks (ResNets), or densely connected neural networks (DenseNets) and related sub-networks. In one embodiment, the optimization is based on a resource budget for generating the requested model. The budget may be included in the modeling request. The resources identified in a budget include one or more of: time, processor cycles, memory, network bandwidth, a monetary unit, machine type (e.g., where the training is performed using virtual machines or distributed servers, the user may specify a type of machine used for generating the new machine learning model), or number of graphical processing units (GPUs) used. The learning parameters may be identified by comparing models generated from previous modeling requests with similar budgets. In one embodiment, a first budget is deemed similar to a second budget if the difference between the first budget and the second budget is within a threshold tolerance range.

Over multiple trainings across users and use-cases, the system determines efficient starting points (e.g., initial learning parameters) for HPO. The system learns the mapping between the characteristics (features) of training data (such as number of samples, analysis type, data size, average pixel intensity etc.) and initializations (such as network type, subnetwork to be trained, algorithm type, learning rate, etc.). In one embodiment, the learning is achieved by aggregating the characteristics and initializations for trained models and storing the aggregation data in a look up table or other searchable data store. In such embodiments, when a modeling request is received by the system, the parameters included in the request may be used to search the look up table or other searchable data store for aggregated data most closely associated with the modeling request. In one embodiment, the learning is achieved by searching a library of trained models based on the modeling parameter and, in some embodiments, model interaction data to identify relevant training data or initializations for the requested model.

Based on the one or more of the factors described, the modeling request service 120 identifies a trained model to use as the starting point to train a new machine learning model for the modeling request 102. An image model trainer 130 executes the training of the requested model based, at least in part, on the trained image model retrieved from the image model data store 180.

For machine learning embodiments, training a model includes adjusting the weights between nodes included in the model such that the model including the adjusted weights provides an image processing result that is more accurate than the pre-adjusted weights. To increase the accuracy, backpropagation or other machine learning techniques are used by the image model trainer 130.

Some embodiments of the image model trainer 130 receive learning parameters to further guide the training of the new machine learning model. The learning parameters may be received along with the model retrieved from the image model data store 180. The learning parameters may be received for a different model than the model which is used as the starting point for the training.

After generating the new machine learning model, the image model trainer 130 shown in the environment 100 of FIG. 1 transmits the trained image model to the image data store 180. The transmission causes the trained image model to be included for consideration for future model requests. An identifier is associated with the trained image model to aid in identifying the model.

The image model trainer 130 provides the identifier for the trained image mode to the modeling request service 120. The modeling request service 120 generates the image processing service 190 based on the trained image model. Generating the image processing service 190 may include creating a service instance to receive image requests which are processed using the trained image model to provide image processing results.

If the modeling request 102 includes an identifier for an existing model, then when the modeling request service 120 requests training models from the model data store 180, the identifier will be used to retrieve the training model. If the model is stored in the image model data store 180, the image model trainer may retrain the model according to the modeling request 102. For example, additional training data may be provided to further tune the model.

Figure 2:
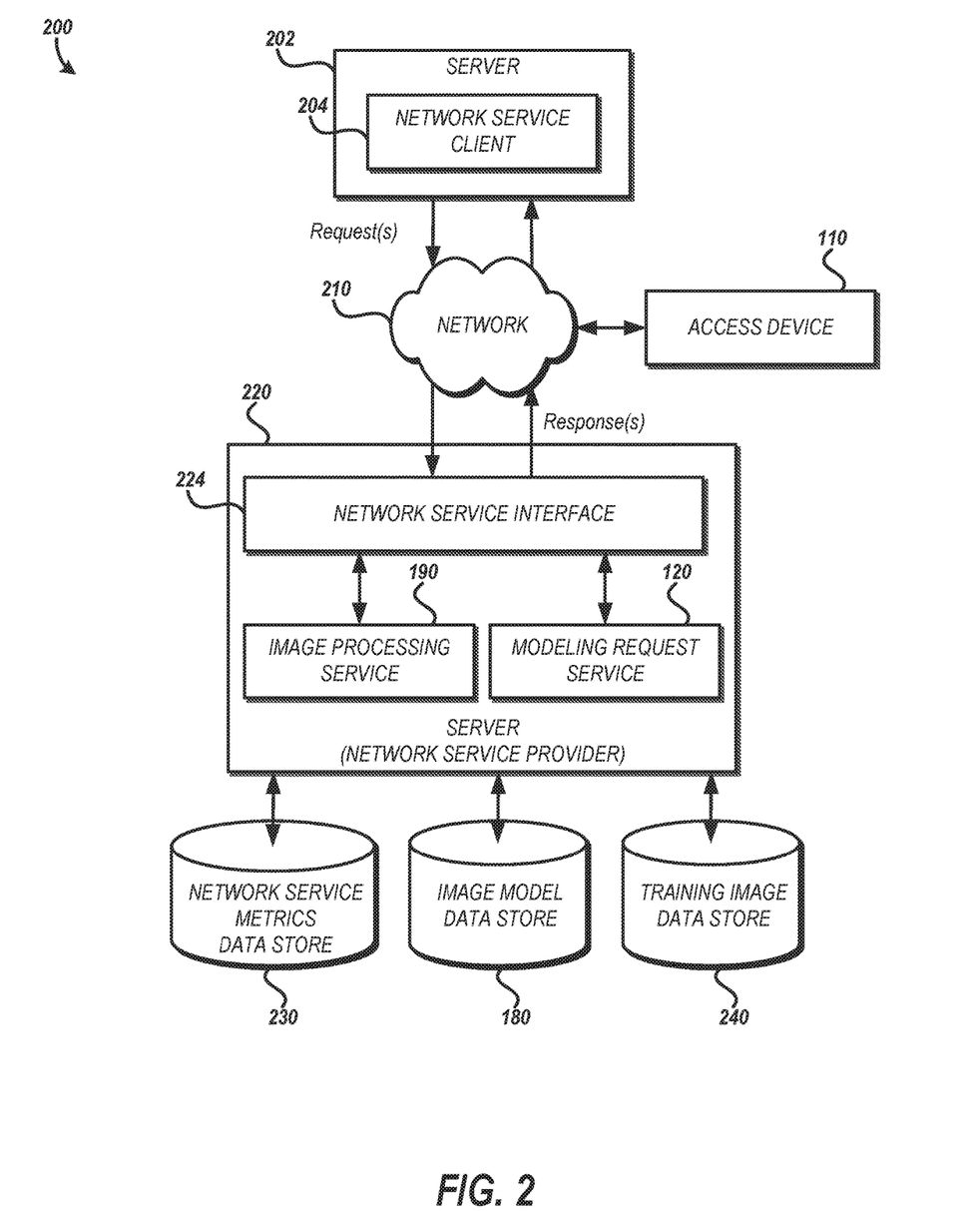
FIG. 2 is a block diagram showing an environment including a network service provider for providing image processing services.

FIG. 2 is a block diagram showing an environment including a network service provider for providing image processing services. The environment 200 shows the interaction between a network service client 204 and a network service provider 220. In this embodiment, a network service interface 224 is implemented on a server 220 coupled to a network 210. The server 220 may be referred to as a "network service provider". The server 220 includes one or more applications or services such as an image processing service 190 and a modeling request service 120. The Server 220 may be coupled to data storage 140 for storing information in database 142. Database 142 may include any type of data.

In the embodiment shown in FIG. 2, the server 202 is coupled to the network 210. The server 210 includes a network service client 204. The network service client 204 programmatically accesses an application or service (e.g., the image processing service 190 or the modeling request service 120) of the server 220 via the network service interface 224. The network service interface 224 provides a programmatic interface via an API through which at least some functionality of an application or service (e.g., the image processing service 190 or the modeling request service 120) is programmatically accessed by a network service client 204. The server 202 or the server 220 may provide a network service such as a web site accessible by an access device 110 via browsers or other applications executing on the access device 110. In some embodiments, the network service client 204 is configured to access at least some functionality of an application or service of the server 220 and/or at least some data in a data store coupled with the server 220 (e.g., the network service metrics data store 230, the image model data store 180, or the training image data store 240) via the network service interface 224. In one embodiment, the network service client 204 provides a network service to other client servers or access devices such as a web application.

To access the image processing service 190, network service client 124 sends a request message to network service interface 224 via the network 210. The network service provider server 220 identifies a requested service based on the request and provides the request to the appropriate service For example, if the request include modeling parameters to create or update an image processing service, the network service interface 224 detects the modeling parameters as one indicator of the destination for the request. In some embodiments, the endpoint to which the request is presented identifies the application or service to handle the request. For example, the modeling request service 120 may be hosted at a known network location (e.g., http://networkserviceprovider.com/services/modelingService). In such embodiments, requests presented to the endpoint will be routed to the modeling request service 120. The application provides a response to the request to the network service interface 224 which, in turn, provides the response to the device that transmitted the request (e.g., the server 202 or the access device 110).

As the network service interface 224 receives requests and transmits responses, the network service interface stores information regarding the service interactions in a network service metrics data store 230. The service interaction information may include one or more of: number of requests routed to the service, number of responses sent from the service, the confidence of the responses, time taken for a service to respond to a request, resources utilized by a service to respond to a request, or memory requirements for the service.

In one embodiment, the network service interface 224 monitors a service to collect metrics while it is processing. For example, the modeling request service 120 may generate training information about a model such as learning parameters, model training metrics such as number of generations for training or model accuracy, training speed, memory requirements, or training convergence rate that is collected by the network service interface 224. A training image data store 240 is included in the embodiment shown in FIG. 2 to store images used to train one or more machine learning model. The training data includes images which have been previously processed to identify specific items of interest. The images may include the processing information as labels of the object or location of the object shown within the image. The quantity, quality, or both for the training image data may be determined and stored in the network service metrics data store 230 in association with the model generated based on the training data. In one embodiment, the modeling request service 120 stores the interaction metrics directly in the network service metrics data store 230.

As another example, a model generated by the modeling request service 120 may be published as a new image processing service of the server 220. As shown in FIG. 2, the image processing service 190 may represent a final result of a request processed by the modeling request service 120. The interaction metrics for the image processing service 190, or similar image processing services, may include a number of requests, accuracy for responding to an image processing request, or the like. As with the modeling interaction information, the network service interface 224 or the image processing service 190 are configured to store the image processing information in a network service metrics data store 230.

Figure 3:
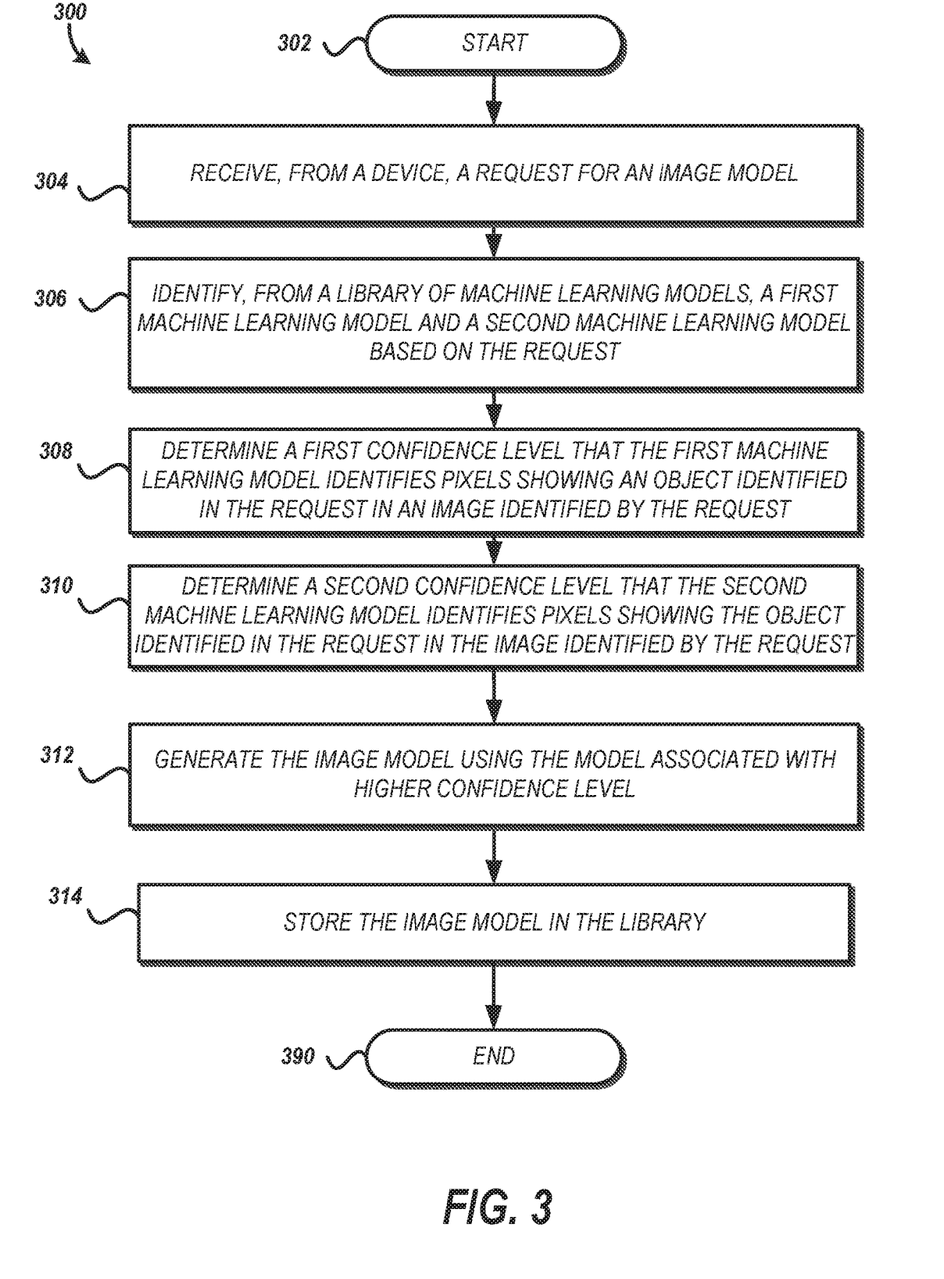
FIG. 3 is a process flow diagram showing an example of a method for generating an image model.

FIG. 3 is a process flow diagram showing an example of a method for generating an image model. The method 300 is implemented by a computing device such as the network service provider server 120 shown in FIG. 2 under the control of one or more processor. The method 300 illustrates one embodiment for taking an image model request and efficiently generating the image model using previously trained models.

The method 300 begins at block 302. At block 304, a request for an image model is received from an electronic communication device. In one embodiment, the request identifies a task for the image model to perform, and training data including a labeled image. The task is at least one of: identifying a location of an object within an image or identifying the object within the image. The labeled image includes an identification of pixels showing the object within an image.

At block 306, a first machine learning model and a second machine learning model are identified from a library of machine learning models. The identification is, based on the task or the object associated with the request received at block 304. For example, the first and second machine learning model may include metadata indicating the types of object identified by the models. Descriptive metadata included in the modeling request is compared with the metadata associated with the models included in the library to identify those machine learning models which are relevant to the requested model. Domain information for the requesting client or user is compared in some embodiments to the domain associated with machine learning models in the library to identify those machine learning models which may be relevant to the requested model.

In one embodiment, the identification includes comparing the data used to train the models with the reference image data associated with the request. For example, first machine learning model is associated with training data, identifying the first machine learning model includes determining that a property for the set of reference images corresponds to the property for the training data. The property identifies at least one of: a number of images, a pixel intensity for the images, or a size of the images in the respective set of images.

At block 308, a first confidence level that the first machine learning model identifies the pixels showing the object included in the labeled image is determined. The first confidence level indicates how well the first machine learning model can perform the requested task for the training data associated with the request. In one embodiment, the first confidence level is generated by processing the labeled image with the first machine learning model to receive, as an output, the confidence for predicting the object.

At block 310, a second confidence level that the second machine learning model identifies the pixels showing the object included in the labeled image is determined. The second confidence level indicates how well the second machine learning model can perform the requested task for the training data associated with the request. In one embodiment, the second confidence level is generated by processing the labeled image with the second machine learning model to receive, as an output, the confidence for predicting the object.

At block 312, the image model is generated using the model associated with the highest confidence level. In some embodiments, generating the image model includes generating a learning parameter for the image model based on the set of labeled image data, the first machine learning model, and the second machine learning model. The learning parameter defines a property of the image model or a property of the training of the image model. In some embodiments, generating the image model may include selecting a portion of the model associated with the highest confidence to include in the image model. For example, a size of the set of labeled data is compared to a size of a set of training data used to train the model and, based on the comparison, one or more portions of the machine learning model is selected to include in the image model. A portion, in one embodiment, includes a convolution layer that receives image data as an input and provides a vector of feature detection results (e.g., predictions) as an output.

Figure 4A:
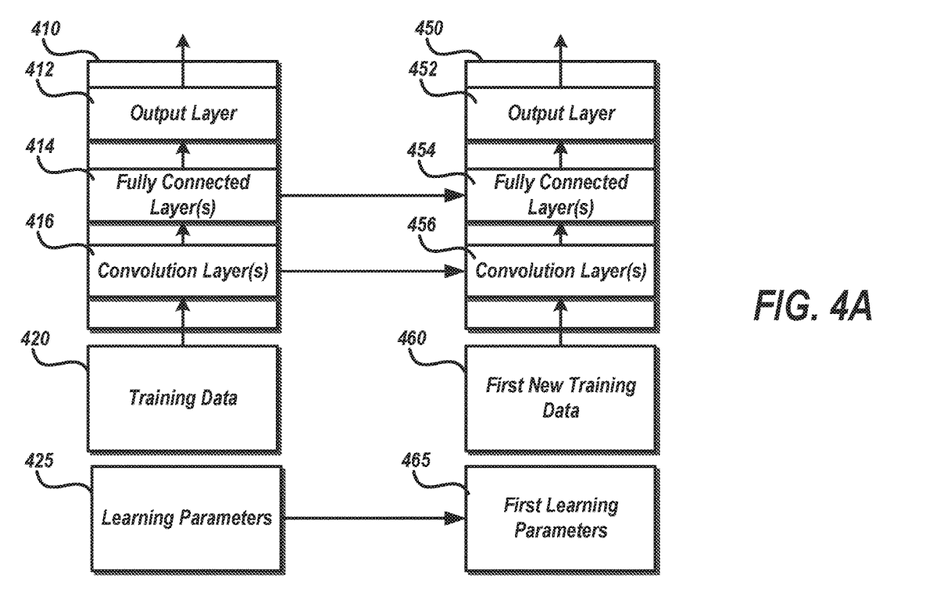
FIG. 4A is a block diagram showing how a trained model is used to generate a new machine learning model.

FIG. 4A is a block diagram showing how a trained model is used to generate a new machine learning model. The trained model in FIG. 4A includes a convolutional neural network 410. The convolutional neural network 410 includes a one or more convolutional layers 416, one or more fully connected layers 414, and an output layer 412. The convolutional layers 416 receive images such as training data 420 to generate, from the output layer 412, an image processing result. The training of the model is driven, in part, by learning parameters 425.

FIG. 4A shows a new machine learning model 450 generated from the pre-trained convolutional neural network 410. The modeling request for the new machine learning model identifies first new training data 460. A comparison between the first new training data 460 and the training data 420 suggests that the convolution layer(s) 416 and the fully connected layer(s) 414 from the trained model 410 should be used as the fully connected layers 454 and convolution layers 456 of the new machine learning model 450. Given the similarities, the learning parameters 425 are also used as a starting point for first learning parameters 465 to train the new machine learning model. Training the new machine learning model 450 creates a new output layer 452 for the modeling request.

Figure 4B:
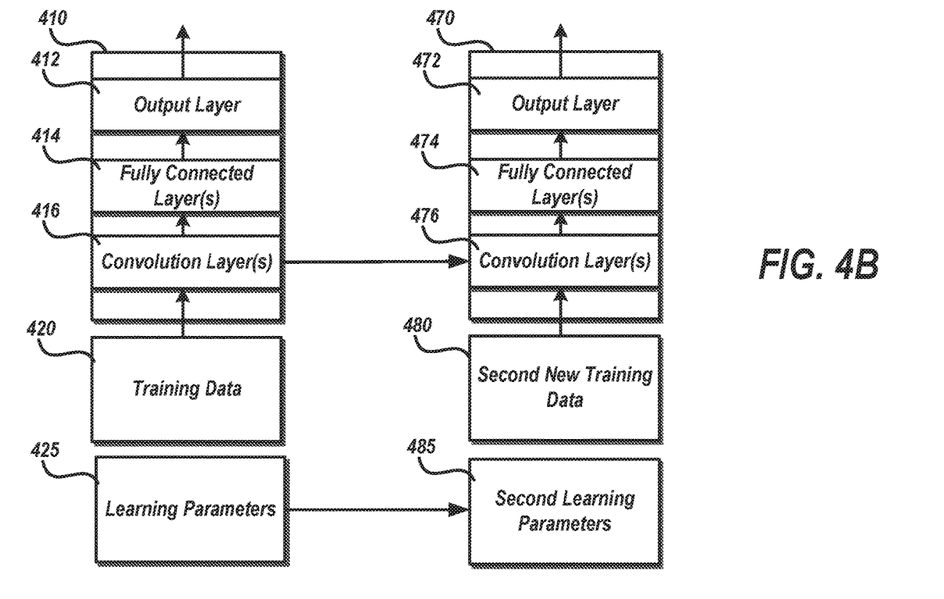
FIG. 4B is a block diagram showing how a portion of a trained model is used to generate a new machine learning model.

FIG. 4B is a block diagram showing how a portion of a trained model is used to generate a new machine learning model. Unlike FIG. 4A, second new training data 480 associated with a second modeling request is different from the training data 420. The difference may be in the number of images, the quality of the images, the size of the images, the average pixel intensity of the images, or other metric characterizing the training data 420 and the second new training data 480. In the embodiment shown in FIG. 4B, only the convolution layers 416 are included in the new machine learning model 470 as convolution layers 476. The learning parameters 425 are also applied to the new machine learning model as second learning parameters 485. The structure of the fully connected layers 474 and output layer 470 are generated through training based on the second learning parameters 485. Thus, while the trained model may not be suitable for processing the second new training data 480, the parameters used to generate the trained model may help expedite the generation of the new machine learning model for the second modeling request.

Table 1 provides an example of comparisons between data sets of the requested model and a pre-trained model for determining what, if any, structural features from the pre-trained model should be used in generating the image model.

TABLE 1

|  | Similar dataset | Different dataset |
| --- | --- | --- |
| Small dataset | Use pre-trained model feature extractor and classifier (transfer learning) | Use pre-trained model low level feature detection and classifier (fine-tuning) |
| Large dataset | Fine-tune pre-trained model classifier (fine-tuning) | Train from scratch without structure from pre-trained model (full training) |

Returning to FIG. 3, the method 300 at block 314 stores the image model in the library. Storing the image model makes the model generated at block 312 available for generating subsequently requested models. Storing the image model makes the machine learning model generated at block 312 available for retraining through a subsequent modeling request including an identifier for the model. Storing the image model makes the machine learning model generated at block 312 available for inclusion in an image processing service. For example, in one embodiment, a network service is associated with a network location. The network service receives an image for processing by the image model. In one embodiment, the network service includes security processing to ensure the images are processed only for authorized clients. Authorization is based on information included in the request or prior to receiving the request such as a security token, username or password information, or other credential. When the image is received at the endpoint, the image processing service retrieves the image model from the library and provides the image as an input to the image model. The result provided as an output from the image model is then returned as a response to the request. The response includes one or more of segmentation information of classification information for the object shown in the image. In one embodiment, the image model is stored in memory such as a cache or virtual machine instance. In such embodiments, the image model is retrieved at start up and, if provided, a specified refresh schedule. The method 300 ends a block 390, but may be repeated to generate a new machine learning model or retain an existing model.

Figure 5:
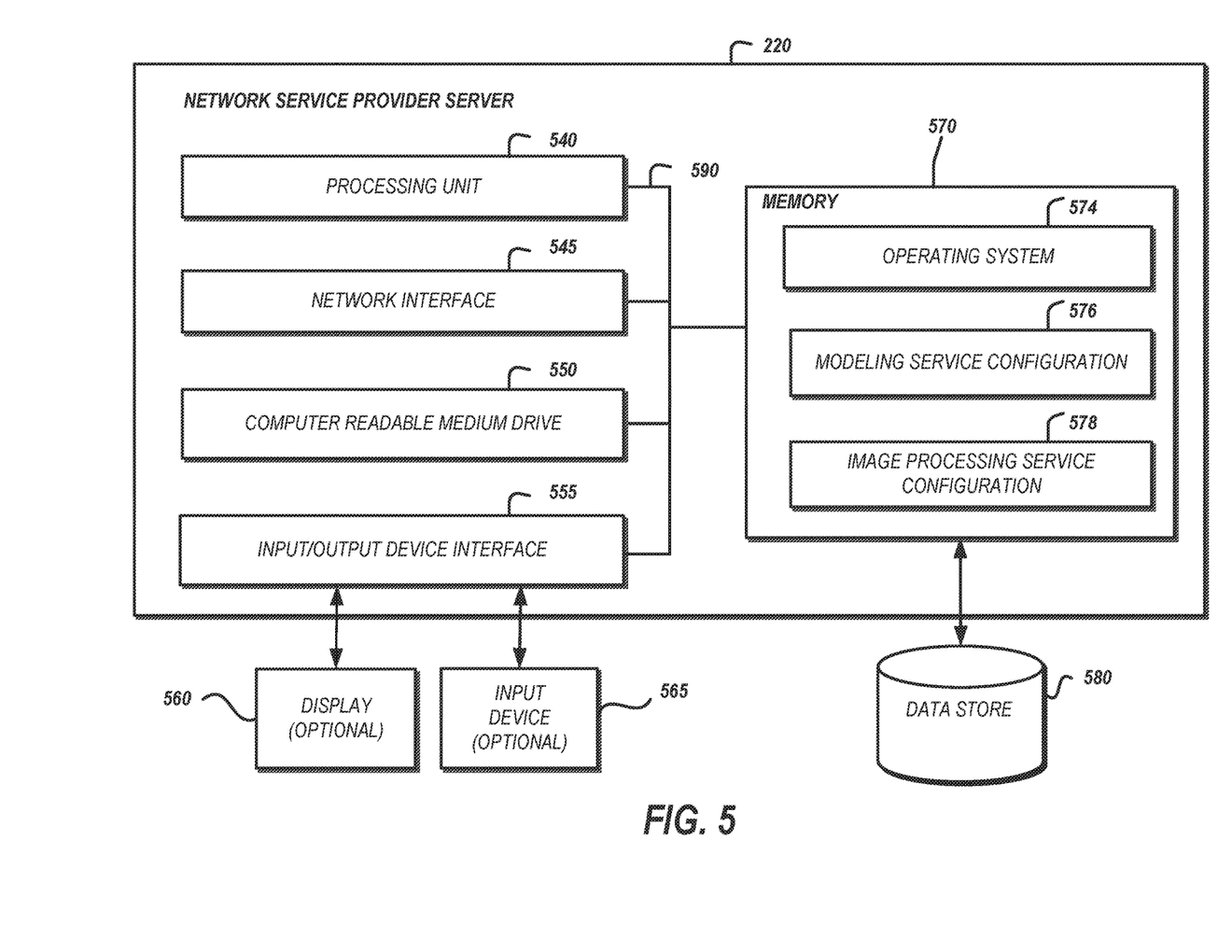
FIG. 5 is a block diagram depicting an illustrative architecture for a computing device providing modeling services.

FIG. 5 is a block diagram depicting an illustrative architecture for a computing device providing modeling services. An embodiment of the network service provider server 120 shown in FIG. 5 includes a processing unit 540, a network interface 545, a computer readable medium drive 550, an input/output device interface 555, and a memory 570. The network interface 555 provides connectivity to one or more networks or computing systems such as the network 210 shown in FIG. 2. The processing unit 540 receives information and instructions from other computing systems or services via the network interface 545. In some embodiments, the network interface 545 stores data directly to memory 570. The processing unit 540 communicates to and from the memory 570 and outputs information to an optional display 560 via the input/output device interface 555. In one embodiment, the input/output device interface 555 accepts input from an optional input device 565, such as a keyboard, mouse, digital pen, microphone, mass storage device, etc.

The memory 570 generally includes RAM, ROM, and/or other persistent, non-transitory computer readable media. The memory 570 stores an operating system 574 that provides computer program instructions for use by the processing unit 540 or other elements included in the computing device in the general administration and operation of the network service provider server 120. In one embodiment, the memory 570 further includes computer program instructions and other information for implementing aspects of generating models described.

For example, in one embodiment, the memory 570 includes a modeling service configuration 576. The modeling service configuration 576 includes thresholds or other values to support the modeling operations, such as generating a model and an associated image processing service, described herein. The memory 570 shown in FIG. 5 also stores an image processing service configuration 578. The image processing service configuration 578 includes the configuration information for a specific image processing service such as the model supporting the image processing service, security information for the image processing service, or other service parameters for providing and executing the image processing service to a network service client or an access device.

In one embodiment, the configurations store specific values for a given configuration. For example, the threshold for determining whether a value included in a modeling request is similar to aggregated data or other information associated with a previously trained model may be specified as an absolute value (e.g., every day, week, 10 days, etc.). In some embodiments, the values are provided in a look up table indexed by one or more characteristics of the model or the information upon which the model was generated (e.g., a modeling request value, training data, training data metrics, or training result(s)).

Rather than storing express values for a particular configuration element, one embodiment stores information that allows the network service provider server 120 to obtain a dynamically generated value for the given configuration element. For example, the identity of the default constraint engine may be specified as a network location (e.g., URL) in conjunction with username and password information to access the network location to obtain the modeling or image processing service parameters used by the network service provider server 120.

In the embodiment shown in FIG. 5, the memory 570 communicates with one or more auxiliary data stores, such as a data store 580. The data store 150 electronically stores data generated by the network service provider server 120 such as in servicing modeling requests, training models, providing image processing services, and the like.

The elements included in the network service provider server 120 are coupled by a bus 590. The bus 590 includes one or more of: a data bus, communication bus, or other bus mechanism to enable the various components of the network service provider server 120 to exchange information.

In some embodiments, the network service provider server 120 includes additional or fewer components than are shown in FIG. 5. For example, a network service provider server may include more than one processing unit 540 and/or computer readable medium drive 550. In another example, the network service provider server 120 may not be coupled to a display (e.g., the display 560) or an input device (e.g., the input device 565). In some embodiments, two or more network service provider servers together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a network service provider server, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A network service provider server can be or include a microprocessor, but in the alternative, the network service provider server can be or include a controller, microcontroller, or state machine, combinations of the same, or the like configured to generate and publish image processing services backed by a machine learning model. A network service provider server can include electrical circuitry configured to process computer-executable instructions. Although described herein primarily with respect to digital technology, a network service provider server may also include primarily analog components. For example, some or all of the modeling and service algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a network service provider server, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the network service provider server such that the network service provider server can read information from, and write information to, the storage medium. In the alternative, the storage medium can be integral to the network service provider server. The network service provider server and the storage medium can reside in an ASIC. The ASIC can reside in a user terminal. In the alternative, the network service provider server and the storage medium can reside as discrete components in a user terminal (e.g., access device or network service client device).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some embodiments, the generating may return location information identifying where the generated information can be accessed. The location information may include a memory location, network locate, file system location, or the like.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), FLASH™, JAVA™, .NET™, web services, and rich site summary (RSS). In some embodiments, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   under control of one or more processors,
   receiving, from an electronic communication device, a request for an image model, wherein the request identifies:
   (i) a task for the image model to perform, wherein the task comprises at least one of identifying a location of an object within an image or identifying the object within the image, and
   (ii) training data including a labeled image, wherein the labeled image includes an identification of pixels showing the object;
   identifying, from a library of machine learning models, a first machine learning model and a second machine learning model, based on the task or the object;
   determining a first confidence level that the first machine learning model identifies the pixels showing the object included in the labeled image;
   determining a second confidence level that the second machine learning model identifies the pixels showing the object included in the labeled image;
   determining that the first confidence level is greater than the second confidence level;
   generating a learning parameter for the image model based on a set of labeled image data, the first machine learning model, and the second machine learning model, wherein the learning parameter defines a property of the image model or a property of a training of the image model;
   generating the image model from the first machine learning model, the training data, and the learning parameter; and
   storing the image model in the library of machine learning models.

2. The computer-implemented method of claim 1, further comprising:
   determining that a size of the set of labeled data exceeds a size of a set of training data used to train the first machine learning model; and
   selecting a portion of the first machine learning model to include in the image model, wherein the portion receives image data as an input and provides a vector of feature detection results as an output.

3. The computer-implemented method of claim 1, further comprising:
   receiving the image model in association with the request; and
   storing the image model in the library of machine learning models.

4. The computer-implemented method of claim 1, further comprising:
- receiving, from the electronic communication device, an image for processing by the image model;
- retrieving the image model from the library;
- processing the image using the image model to generate an image processing result, the image processing result including at least one of segmentation information or classification information for the object shown in the image; and
- transmitting the image processing result to the electronic communication device.

5. A system comprising:
- one or more computing devices having a processor and a memory, wherein the one or more computing devices execute computer-readable instructions to:
  - receive, from an electronic device, a request for an image model that identifies a characteristic of an object shown in a set of reference images;
  - determine a first image processing result indicating a first confidence for detecting the characteristic of the object shown in an image included in the set of reference images;
  - determine a second image processing result indicating a second confidence for detecting the characteristic of the object shown in the image included in the set of reference images;
  - determine that the first confidence is associated with a higher confidence level than the second confidence;
  - select, from a library of machine learning models, a first machine learning model based on the request and the first confidence;
  - generate the image model from the first machine learning model and the set of reference images; and
  - store the image model in the library of machine learning models.

6. The system of claim 5, wherein the request includes information identifying: (i) the characteristic for the image model to identify, wherein the characteristic comprises one of: detection of the object within an image or pixels representing the object with the image, and (ii) the set of reference images.

7. The system of claim 5,
- wherein the first machine learning model is associated with metadata identifying the object, and
- wherein the one or more computing devices execute computer-readable instructions to select the first machine learning model based on the metadata and the object associated with the request.

8. The system of claim 5,
- wherein the first machine learning model is associated with training data, and
- wherein the one or more computing devices execute computer-readable instructions to:
  - generate a first metric characterizing a property of the set of reference images, wherein the property comprises one of: a size of the set of reference images, pixel intensity for the set of reference images, or a size of images included in the set of reference images;
  - generate a second metric characterizing the property for the training data.

9. The system of claim 5, wherein the one or more computing devices execute computer-readable instructions to:
- receive, from a client device, an image for processing by the image model;
- retrieve the image model from the library;
- process the image using the image model to generate an image processing result, the image processing result including at least one of segmentation information or classification information for the object shown in the image; and
- transmit the image processing result to the client device.

10. The system of claim 5, wherein the one or more computing devices execute computer-readable instructions to:
- determine that a size of the set of reference images exceeds a size of a set of training data used to train the first machine learning model; and
- select a portion of the first machine learning model to include in the image model, wherein the portion receives image data as an input and provides a vector of feature detection results as an output.

11. The system of claim 10, wherein the first machine learning model comprises a convolution neural network including a convolution layer and a fully-connected layer, and wherein the portion comprises the convolution layer.

12. The system of claim 5,
- wherein the first machine learning model is associated with a first learning parameter identifying a property of the first machine learning model or training of the first machine learning model,
- wherein a second machine learning model is associated with a second learning parameter identifying the property of the second machine learning model, and
- wherein the one or more computing devices execute computer-readable instructions to:
  - train a first version of the image model using: (i) the first learning parameter and (ii) at least a portion of the set of reference images for a number of generations;
  - train a second version of the image model using: (i) the second learning parameter and (ii) at least the portion of the set of reference images for the number of generations;
  - generate a first confidence metric for the first version of the image model, wherein the first confidence metric identifies a number of objects correctly identified by the first version of the image model;
  - generate a second confidence metric for the second version of the image model, wherein the second confidence metric identifies another number of objects correctly identified by the second version of the image model;
  - determine that the second confidence metric corresponds to a higher degree of confidence than the first confidence metric; and
  - train the image model using the second learning parameter.

13. A computer-implemented method comprising:
under control of one or more processors,
- receiving, from an electronic device, a request for an image model that identifies a characteristic of an object shown in a set of reference images;
- determining a first image processing result indicating a first confidence for detecting the characteristic of the object shown in an image included in the set of reference images;
- determining a second image processing result indicating a second confidence for detecting the characteristic of the object shown in the image included in the set of reference images;

determining that the first confidence is associated with a higher confidence level than the second confidence;

selecting, from a library of machine learning models, a first machine learning model based on the request and the first confidence;

generating the image model from the first machine learning model and the set of reference images; and storing the image model in the library of machine learning models.

14. The computer-implemented method of claim 13, wherein the request includes information identifying: (i) the characteristic for the image model to identify, wherein the characteristic comprises one of: detection of the object within an image or pixels representing the object with the image, and (ii) the set of reference images.

15. The computer-implemented method of claim 13, wherein the first machine learning model is associated with training data, and wherein the computer-implemented method further comprises determining that a property for the set of reference images corresponds to the property for the training data, wherein the property identifies one of: a number of images, a pixel intensity for the images, or a size of the images.

16. The computer-implemented method of claim 13, further comprising:

receiving, from a client device, an image for processing by the image model;

retrieving the image model from the library;

processing the image using the image model to generate an image processing result, the image processing result including at least one of segmentation information or classification information for the object shown in the image; and transmitting the image processing result to the client device.

17. The computer-implemented method of claim 13, wherein the first machine learning model comprises a convolution neural network including a convolution layer and a fully-connected layer, wherein the convolution layer receives image data as an input and provides a vector of feature detection results as an output, and wherein the computer-implemented method further comprises:

determining that a size of the set of reference images exceeds a size of a set of training data used to train the first machine learning model; and including the convolution layer of the first machine learning model in the image model.

18. The computer-implemented method of claim 13, wherein the first machine learning model is associated with a first learning parameter identifying a property of the first machine learning model or training of the first machine learning model, wherein a second machine learning model is associated with a second learning parameter identifying the property of the second machine learning model, and wherein the computer-implemented method comprises:

training a first version of the image model using: (i) the first learning parameter, and (ii) at least a portion of the set of reference images for a number of generations;

training a second version of the image model using: (i) the second learning parameter, and (ii) at least the portion of the set of reference images for the number of generations; and determining, based at least partly on the first version of the image model and the second version of the image model, to train the image model using the second learning parameter; and training the image model using the second learning parameter.

19. The computer-implemented method of claim 13, further comprising:

identifying a topical domain for a user associated with the request, wherein selecting the first machine learning model comprises:

determining that the topical domain is associated with a domain associated with the first machine learning model.

* * * * *